Oct. 25, 1960

A. C. ANSLEY 2,958,013

ELECTRICAL UNIT

Filed Aug. 20, 1956

INVENTOR.
ARTHUR C. ANSLEY
BY Albert Sperry.
ATTORNEY

Oct. 25, 1960 A. C. ANSLEY 2,958,013
ELECTRICAL UNIT
Filed Aug. 20, 1956 2 Sheets-Sheet 2

INVENTOR.
ARTHUR C. ANSLEY
BY Albert Sperry
ATTORNEY

United States Patent Office 2,958,013
Patented Oct. 25, 1960

2,958,013

ELECTRICAL UNIT

Arthur C. Ansley, Solebury Township, Bucks County, Pa., assignor to Arthur Ansley Manufacturing Co., Solebury Township, Bucks County, Pa., a corporation of Pennsylvania Filed Aug. 20, 1956, Ser. No. 605,916

8 Claims. (Cl. 317—101)

This invention relates to electrical circuit elements and is directed particularly to novel printed circuit plates adapted to be used in combination to form rugged columns and compact assemblies capable of greatly increased variation in circuitry.

Printed circuits are generally formed with a base consisting of a stiff, flat sheet of laminated or other insulating material having a binder of phenolic, melamine, epoxy, silicone or other plastic material. The circuits are then laid out on the insulating base by printing, etching, electroforming, hot stamping or otherwise to produce the desired circuit in the form of metallic lines or filament bonded to the plastic. When the printed circuit is to form a removable portion of a large circuit, leads or terminals for the circuits generally extend to the edges of the plates and connections are established by means of sockets or connectors having spring contacts engageable with the printed circuit. Resistors, capacitors, transistors and other elements also may be mounted on the plate and connected to the printed circuit by soldering or otherwise.

While printed circuits have many advantages and are especially useful in large scale production of conventional flat planar circuits by machine operations, they cannot always be employed in complicated circuits and they are not well suited for supporting tube sockets and tubes in compact arrangement, as for example in producing the units or "modules" so widely used in electronic computers, telemetering and elsewhere.

The modules used in such systems are often employed in large numbers and are designed to be readily removed and replaced in interchanging or substituting one unit for another. Therefore they not only must be compact, but they also must be sufficiently rugged to permit easy and frequent handling thereof. On the other hand, the circuits embodied in such units are often rather complicated and not suited for layout in the planar form which characterizes conventional printed circuits. As a result, printed circuit elements are not generally used in this type of modular circuits. Instead, a typical module or unit may comprise a central insulated post having a tube socket mounted on the upper end thereof and having capacitors, resistors and other elements with their associated connections arranged about the sides of the post and within an outer metal shell which may serve to shield the assembly from external influences.

The construction of such modules is difficult and time consuming because of the intricate arrangement and small size of the elements frequently required and the difficulty in assuring proper soldering of the elements and rigid support thereof within the limited space available for operation.

In accordance with the present invention, these and other limitations and objections inherent in printed circuits and modular or unit constructions of the prior art are overcome and means are provided whereby printed circuits can be used in producing rugged modules of the most complicated and varied design, whereas the construction, assembling and soldering of the parts employed is greatly simplified.

These advantages are preferably attained by providing printed circuit elements arranged in intersecting planes and in mutually supporting relation to provide a column affording much greater strength as well as increased space for operation in attaching or soldering of parts. The arrangement further provides increased surface for the printing of circuits and the attachment of elements whereby greater flexibility of circuit arrangement within a very limited space is possible. In a typical and preferred construction embodying the present invention, printed circuit plates are provided with complementary slots for interfitting in crossed relation to form a column and one or more end pieces or bases engage the ends of the plates and hold them rigidly in place. The circuits carried by such plates can then extend from one plane to another so as to permit three dimensional circuit design instead of the usual planar design of printed circuitry. At the same time the column resulting from the crossed relation of the plates provides the necessary support to permit a tube socket and tube to be securely mounted on the end piece adjacent the intersecting edges of the plates.

The principal objects of the present invention are to increase the strength of the assembly, to simplify the production of modules or units employed in electrical systems and to provide increased area for circuitry and for the mounting of components in a limited space.

Another object of the invention is to adapt printed circuit constructions to three dimensional circuit design.

A further object of the invention is to provide novel types of printed circuit elements which are capable of assembly in producing rugged and complex units for electrical systems.

A further object of the invention is to provide improved types of printed circuit assemblies adapted to be produced by standard manufacturing equipment and techniques.

A specific object of the invention is to provide printed circuit plates with complementary slots and end pieces or bases permitting arrangement of the plates in crossed and fixed relation so as to be mutually supporting and provide for the mounting of a tube socket or other circuit component adjacent the intersecting edges of the plates.

These and other objects and features of the present invention will appear from the following description thereof wherein reference is made to the figures of the accompanying drawing.

Figure 1:
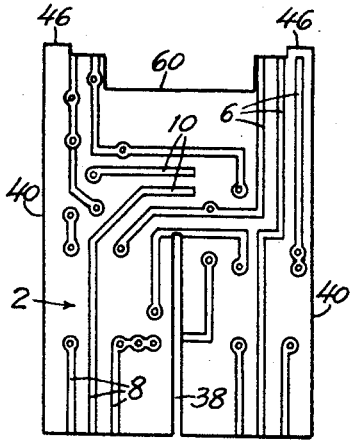
Fig. 1 is a front view showing the printed circuit on one typical plate embodying the present invention.
Figure 2:
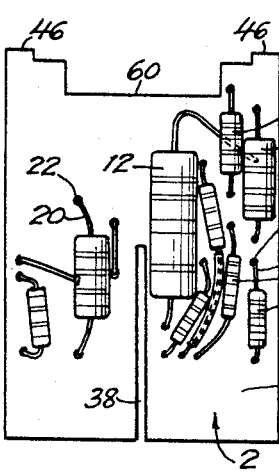
Fig. 2 is a rear view of the plate shown in Fig. 1.
Figure 3:
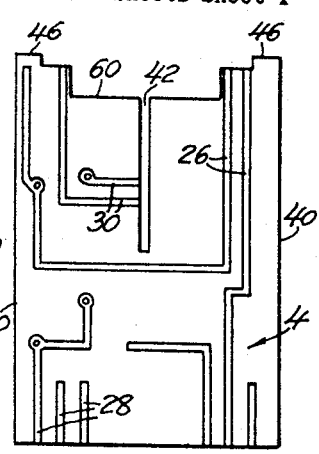
Fig. 3 is a front view showing another printed circuit plate which is complementary to that of Fig. 1.
Figure 4:
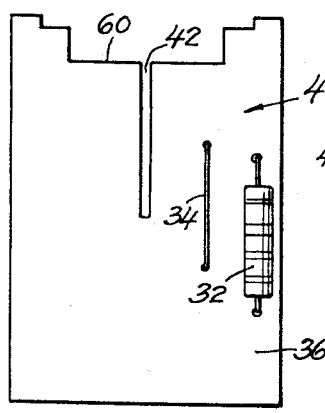
Fig. 4 is a rear view of the plate shown in Fig. 3.

In that form of the invention chosen for purposes of illustration in Figs. 1 to 9 of the drawings, the unit or module includes two complementary printed circuit plates one of which is indicated at 2 and is illustrated in Figs. 3 and 4.

The plate 2 is rectangular in shape and composed of a stiff layer of insulating material and has various circuit elements carried thereby in the form of conducting material 6, 8 and 10, which is fixedly bonded to one face of the plate as shown in Fig. 1. Various elements such as capacitors, resistors, and transistors 12, 14 and 16 are located on the opposite insulating face 18 of the plate as shown in Fig. 2 and are connected to the circuit elements 6, 8, and 10 by leads 20 which extend through openings 22 in the plate and are soldered to the elements 6, 8, and 10 as indicated at 24 in Fig. 8.

The plate 4 is of the same general size, shape and type as plate 2 and has circuit elements 26, 28 and 30 bonded to one face thereof as shown in Fig. 3, whereas resistors or other elements 32 and 34 are located on the insulating face 36 of the plate as shown in Fig. 4 and are connected in place and to the various circuit elements 26, 28, and 30 by leads 20 and soldered connections 24.

The plates 2 and 4 are formed to fit together in crossed or angularly disposed relation so that each plate will provide lateral support for the other and cooperate therewith so as to provide a column which constitutes a strong, rigid, self supporting assembly. The shape, size and arrangement of the plate may be varied as when forming structure columns of any type. However, in one of its simplest forms the plates are arranged in crossed relation and the plate 2 is provided with a slot 38 extending inward from the lower end thereof parallel to the edges 40 of the plate and to a suitable point about half way between the ends thereof. The plate 4 is provided with a similar slot 42 which extends inward from the upper end of the plate along the center line thereof to a point about half way between the upper and lower ends of the plate. The slots 38 and 42 are of a width substantially equal to the thickness of the plates so that the plates may be fitted together in crossed relation by inserting the slotted portion of one plate into the slot of the other plate with the sides of each slot engaging the opposite faces of the other plate along the center line thereof. In this way the plates cooperate to provide a stiff, rugged, self supporting column.

Figure 5:
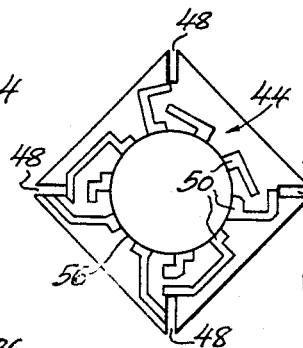
Fig. 5 is a plan view of a typical end piece adapted for use with the plates of Figs. 1 and 3.
Figure 7:
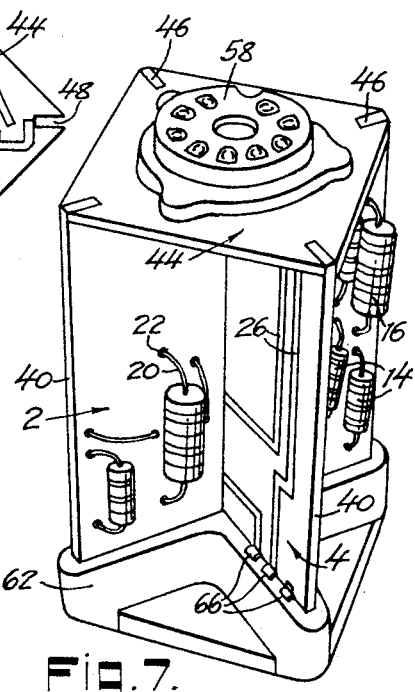
Fig. 7 is a perspective illustrating an assembly embodying the elements of Figs. 1, 3 and 5 as seen from one angle showing various resistors, capacitors, and the like connected in place.
Figure 6:
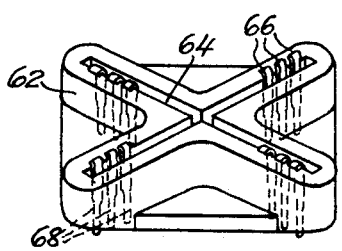
Fig. 6 is a perspective illustrating a typical base which may be employed with the assemblies of the present invention.
Figure 8:
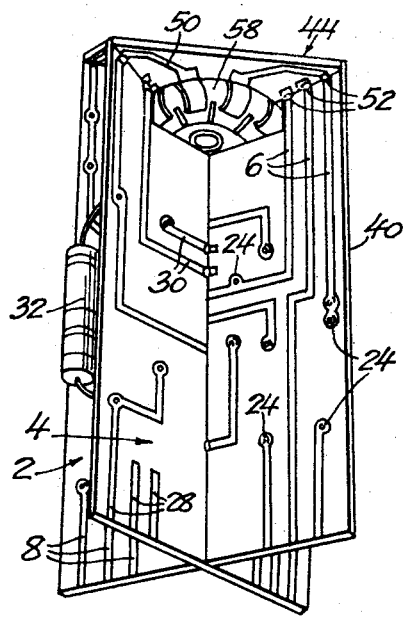
Fig. 8 is a view of the assembly illustrated in Fig. 7 removed from the base and as seen from another angle and showing various soldering points.
Figure 9:
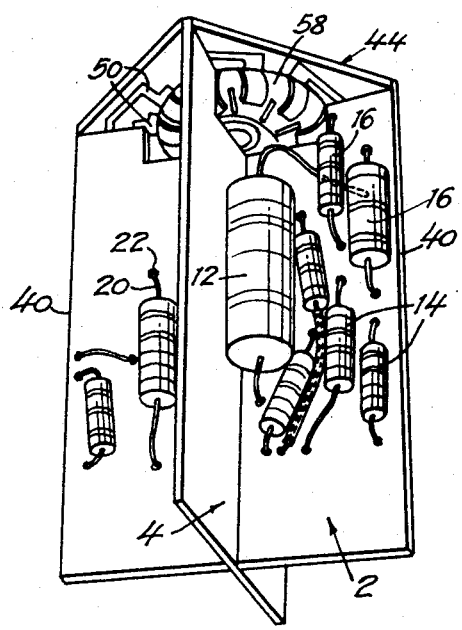
Fig. 9 is a view of the assembly shown in Fig. 8 as seen from the opposite side.

For many purposes, and particularly when the unit is to have a tube mounted thereon, the assembly is further provided with one or more transversely arranged end pieces 44 which extends at right angles to the intersecting planes in which the plates 2 and 4 are located. The plates are formed with positioning tabs or projections 46 at the upper ends thereof and the end piece 44 is formed with corner recesses 48 into which the projections 46 extend. The end piece thus serves to hold the plates in fixed crossed or angularly disposed relation, preventing displacement thereof even though the slotted portions of the plates may have a loose fit. As shown in Fig. 5, the end piece may also embody printed circuit elements 50 arranged to be connected with the various printed elements such as the conductors 6 and 26 which extend to the upper edges of the plates 2 and 4. Such connection may be established by soldering as shown at 52 or in any other suitable way. Further, the assembled plates and pieces may be secured together by the application of an adhesive such as an epoxy resin composition at the various points and lines of contact between the plates and end pieces. The adhesive may conveniently be applied after soldering of the elements and other components of the assembly in place.

Figure 10:
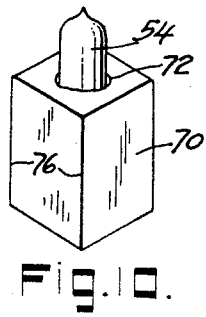
Fig. 10 is a perspective of a typical unit with the outer shielding in accordance with the present invention.

When the unit includes a tube as shown at 54 in Fig. 10, the end piece 44 may be provided with a central opening or recess 56 into which a tube socket 58 will fit so as to be connected to the printed circuit elements on the end piece by soldering or otherwise. If desired, the upper edges of the plates 2 and 4 also may be cut away as shown at 60 to present surfaces which provide space to receive the tube socket and may, if desired, support and hold it rigidly in place.

The lower end of the column thus formed may be rested upon or secured to any suitable support and may afford connection to circuit elements of a larger system in any suitable way. As shown the assembly is provided with a base 62 which may be molded, cast or otherwise formed to present a recess 64 in the shape of a cross or in any other appropriate shape to receive the lower edges of a plurality of plates such as the assembled plates embodied in a particular type of column. The base 62 thus serves to hold the plates 2 and 4 in fixed angular relation and cooperates with the end piece 44 to insure positive and rigid positioning of the plates despite any looseness of the interfitting slots 38 and 42.

The base has connections such as spring contacts 66 positioned within the recess 64 in locations to engage the printed elements or terminals 8 on the plate 2 and the printed elements or terminals 28 on the plate 4 so as to permit the column to be inserted into place in the base for completing a circuit through the various elements formed on or connected to the plates. The connections 66 may in turn be connected to an extended circuit or device in which the unit is to be used. The base 62 will ordinarily be mounted on or fixed to a panel of the device in which it is employed and the column can be inserted and removed therefrom as a unit. However, if it should be desired to secure the base 62 to the column as a part of the unit itself, the base may be provided with pins 68 for detachable connection with a panel or device. In any event, the unit can be applied to or removed from a circuit for replacement or change in location as readily as a single conventional vacuum tube is handled.

The assembly comprising the various elements of the unit described may be enclosed within a housing as shown at 70 in Fig. 10 and the housing may be formed with an opening 72 in the top thereof to permit the application and removal of a tube 54 to the socket 58 on the end piece of the column without removal of the housing. The housing may, if desired, be frictionally or otherwise secured to the base 62 so that the entire unit with its housing can be handled readily for application to the base and to any desired circuit and in any desired location for which it is adapted. The housing 70 preferably is square in cross section and is formed so that the inner surfaces of its corners 76 will fit closely and frictionally about the vertical edges 40 of the plates 2 and 4 and about the end piece 44. The housing thus provides further support for the plates and aids in retaining the parts in place. Each plate is thus positively supported about its entire periphery and along the center line thereof so that they will not vibrate or become displaced or loosened even when the unit is used in aircraft or in other machinery or locations where they may be subjected to severe vibration or shock.

The assembly described not only serves to provide a rugged column for a module or unit but further serves to extend the utility of printed circuit plates in that the circuits can be laid out on a three dimensional basis as exemplified by the conducting elements 10 on the plate 2 which are connected to the conducting elements 30 on plate 4 which lie in a different plane. The circuits can thus extend around corners and from one series of circuitry to another entirely different series of circuits. As a result, circuits which could not be superimposed for application to printed circuit plates of the prior art or which would require an excessive amount of space for the lay-out of the circuit can be combined on the intersecting plates and end pieces or base of the present invention by printing one portion of the circuit on one plate and another portion of the circuit on another plate or on the end pieces.

The use of intersecting plates not only doubles or multiplies the area available for printing of circuits but also doubles the area in which other elements such as capacitors, resistors, transistors and the like may be located. Furthermore, the various elements may be applied in unobstructed areas, affording access to the parts for ease in soldering or replacement. The production of the printed plates and the application of other elements thereto further can be carried out by existing automatic equipment on a production line basis despite the fact that three dimensional circuit design is employed. The soldering or connection of the circuits on one plate to those on another plate to complete a circuit of three dimensional design is readily effected at the points of intersection such as those presented by conductors 10 on plate 2 and conductors 16 on plate 4.

It will of course be apparent that the insulating material used in forming the printed circuit plates, may have conducting patterns on both faces, in which case the assembly affords additional area for more complex circuits and affords even greater flexibility in circuit design.

The assembly, whether using single or double faced plates, renders it possible to condense a very complicated series of circuit elements into an extremely limited space without introducing any difficulty in production by reason of the crowding of elements into a small space. Moreover, it is not only possible to support each plate rigidly in place about the entire marginal edges thereof, but the plates are further supported along a common axis by a complementary plate and by adhesives so that movement of the free areas thereof is positively prevented. As a result, the danger of rupture or loosening of any soldered connections is greatly reduced. Relative movement of the elements is also overcome so that undesired capacity changes or other influence of one element upon another by reason of movement under vibration is avoided.

The size, shape and style of the printed plates and of the end pieces and bases used in the practice of the present invention can obviously be varied greatly. Thus the column may have transversely extending end pieces 44 at both ends thereof. In the alternative, the angularly disposed plates may be mounted between two bases 62. Certain of the plates may be printed on both faces while other plates may be printed on only one face and, if desired, unprinted insulating plates can be incorporated in the assembly to provide additional support and additional surface for the mounting of capacitors, resistors, transistors, miniature tubes and other circuit elements.

Furthermore, the plates may be disposed at various angles to each other in substantially any crossed or other mutually supporting relation so as to have various cross sectional forms such as those employed in structural columns designed primarily for their strength and rigidity. Typical columns of the latter type may be in the form of an I-beam or H-bar, or may have various other suitable forms as shown diagrammatically in Figs. 11 to 17.

Figure 11:
Figs. 11 to 17 are diagrammatic illustrations showing typical alternative forms of the present invention.

Fig. 11 represents a column in which two printed plates are arranged at right angles to each other in L- or V-shaped relation with the edges of the plates in contact and mutually supporting relation. One or more end pieces or bases may be used with such an assembly to hold the plates in fixed angular relation and for connection of the assembly to a circuit and, if desired, for support of tubes, conductors or other circuit elements.

Figure 12:
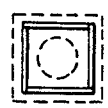
Figure 13:

As shown in Fig. 12 the plates may be arranged in the form of a square column, while in Fig. 13 the plates are arranged to provide a column which is triangular in cross section.

Figure 14:
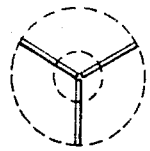
Figure 15:
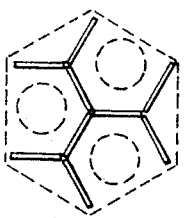

The column shown in Fig. 14 embodies three plates arranged at angles of 120° with respect to each other. This type of column further lends itself to assembly with other columns and plates to form an extended honeycomb arrangement of units in a bank or multiple combination as shown in Fig. 15 whereby very complex and extended circuitry can be arranged in a limited space and provide an extremely rugged construction.

Figure 17:
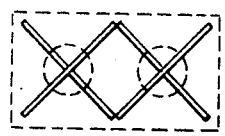
Figure 16:
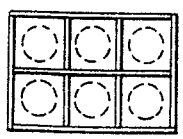

In a similar way, banks of units can be designed by assembling various columns as illustrated diagrammatically in Figs. 16 and 17.

In each of the forms of the invention illustrated and in any other embodiments of the present invention, one or both of the end pieces or bases employed in any column may be formed integral with a panel constituting a part of an electrical device or system. The end piece may be formed integral with a tube socket and the base may be designed for the ready insertion and removal of individual or assembled groups of intersecting plates so as to hold them in position to form a column extending at right angles to the base. In the preferred form of the invention, the angularly disposed plates and the end piece are assembled and fixedly secured together to form an integral unit by the application of adhesive to the engaging edges and surfaces of the parts after assembly of the electrical elements thereon has been completed. On the other hand, the base is preferably fixed to a panel or support so that the assembled plates and end pieces can be applied to the base by slipping the free ends of the plates into the angularly disposed grooves or recesses in the insulating base.

In view of the many alternative forms and arrangements of elements which may be embodied in the columns and assemblies of the present invention, it will be apparent that constructions embodying the present invention are capable of wide variation in application to adapt the invention to a multitude of alternative uses. Accordingly, it should be understood that the particular embodiments of the invention shown in the drawings and described above are intended to be illustrative only and are not intended to limit the scope of the invention.

I claim:

1. An electrical unit comprising a column embodying a pair of stiff, insulating plates of generally rectangular shape, each of which plates has a slot therein substantially equal in width to the thickness of the other plate and extending from one end of the plate toward the other parallel to the edges of the plate, said plates being arranged in crossed relation with the slots therein in opposed interfitting relation and with the sides of each slot embracing and supporting the other plate along a line spaced from the edges thereof, said plates having conducting elements bonded to the surfaces thereof and electrically connected to each other, and an end piece formed of stiff insulating material secured to said plates and extending across the intersecting ends of the plates at right angles to the planes in which the plates are located and serving to hold said plates in fixed relative positions, said end piece having conducting means thereon connected to the conducting elements on said plates.

2. An electrical unit comprising a column embodying a pair of stiff, insulating plates of generally rectangular shape, each of which plates has conducting elements thereon electrically connected to conducting elements on the other plate, said plates each having a slot therein substantially equal in width to the thickness of the other plate and extending from one end of the plate toward the other end, parallel to the edges thereof, said plates being arranged in crossed relation with the slots therein in opposed interfitting relation with the sides of each slot embracing and supporting the other plate, an end piece extending at right angles to the planes in which said plates are located and fixedly secured to said plates adjacent one end thereof, electrical elements on the end piece electrically connected to the conducting elements on the insulating plates and a base having a recess therein formed to receive and embrace the opposite ends of said plates, said base having contacts thereon engageable with the conducting elements on the plates.

3. An electrical unit comprising a base formed of insulating material having intersecting grooves therein with contact elements located in the grooves, a plurality of printed circuit plates fixedly assembled in intersecting relation corresponding to that of said intersecting grooves, said assembled plates being positioned with the lower edges thereof located in said grooves and with the circuits thereon engaging the contacts in said grooves, and an end piece engaging the upper edges of said plates and holding them in fixed relative positions.

4. An electrical unit comprising a base formed of insulating material having intersecting grooves therein crossing each other substantially at right angles with contact elements located in the grooves, a plurality of printed circuit plates secured together in crossed relation at right angles to each other, said plates being positioned with the lower edges thereof located in said grooves and with the circuits thereon engaging the contacts in said grooves, and an end piece engaging the upper edges of said plates and holding them in fixed relative positions, said end piece having a tube socket thereon and conducting elements connecting the tube socket to the circuits on said plates.

5. An electrical unit comprising two printed circuit plates each of which is formed of stiff insulating material and has electrically conducting elements bonded to the surface thereof, said plates being generally rectangular in shape and each having a slot therein extending inward from one end of the plate substantially midway between the edges thereof parallel to said edges for a distance approximately equal to one-half the length of the plate, said plates being arranged in crossed interfitting relation at right angles to each other with the sides of the slot in each plate engaging the faces of the unslotted portion of the other plate at the intersection of the plates so that the plates support each other throughout the length thereof along the central axis of the unit and cooperate to define separated spaces in which electrical devices may be located, an end piece formed of stiff material secured to said plates at one end thereof and extending at right angles to the planes in which said plates are located and serving to hold the plates in fixed relative positions, at least one of the electrically conducting elements bonded to the surface of one of said plates extending across the intersection of said plates in the unslotted portion thereof from one of said separated spaces to another, and other means electrically connecting the electrical elements on said plates to each other.

6. An electrical unit of the character set forth in claim 5 wherein there are two end pieces serving to hold said plates in fixed relative positions, said end pieces being located at the opposite ends of the crossed plates and each being slotted to receive and hold at least portions of the ends of said plates.

7. An electrical unit comprising a column embodying a pair of stiff insulating plates of generally rectangular shape, each of which plates has a slot therein substantially equal in width to the thickness of the other plate and extending from one end of the plate toward the other parallel to the edges of the plate, said plates being arranged in crossed relation with the slots therein in opposed interfitting relation and with the sides of each slot embracing and supporting the other plate along a line spaced from the edges thereof, said plates having conducting elements bonded to the surface thereof and electrically connected to each other, and a stiff, square end piece extending at right angles to the planes in which said plates are located, said end piece being secured to the ends of both plates and serving to hold said plates in fixed positions at right angles to each other, the plates being of greater width than the length of the sides of the square end piece and lying in planes including the diagonals of the square end piece with the edges of the plates extending substantially to the corner of the end piece.

8. An electrical unit comprising a column embodying a pair of stiff insulating plates of generally rectangular shape, each of which plates has a slot therein substantially equal in width to the thickness of the other plate and extending from one end of the plate toward the other parallel to the edges of the plate, said plates being arranged in crossed relation with the slots therein in opposed interfitting relation and with the sides of each slot embracing and supporting the other plate along a line spaced from the edges thereof, said plates being positioned at right angles to each other and defining separated spaces in which electrical devices may be located, said plates having conducting elements bonded thereto and electrically connected to each other and to electrical devices in said spaces, and a housing enclosing said unit and the sides of said spaces, the sides of the housing engaging and supporting the edges of said plates whereby each plate is supported at its center by the other plate and is supported at its edges by the housing.

References Cited in the file of this patent

UNITED STATES PATENTS

| | | |
|---|---|---|
| 2,226,745 | Schrack | Dec. 31, 1940 |
| 2,474,988 | Sargrove | July 5, 1949 |
| 2,701,346 | Powell | Feb. 1, 1955 |
| 2,707,272 | Blitz | Apr. 26, 1955 |
| 2,764,713 | Alden | Sept. 25, 1956 |

FOREIGN PATENTS

| | | |
|---|---|---|
| 122,563 | Australia | Dec. 22, 1943 |
| 714,323 | Great Britain | Aug. 25, 1954 |